United States Patent [19]
Pittman, Jr.

[11] Patent Number: 6,151,454
[45] Date of Patent: Nov. 21, 2000

[54] PHOTOGRAPHIC LIGHTING APPARATUS FOR CONSISTENT AND ACCURATE EXPOSURE CONTROL

[75] Inventor: Charles William Pittman, Jr., Atlanta, Ga.

[73] Assignee: Measurement Systems, Inc., Atlanta, Ga.

[21] Appl. No.: 09/193,514

[22] Filed: Nov. 17, 1998

[51] Int. Cl.[7] ............................. G03B 15/03; G03B 7/00
[52] U.S. Cl. .......................................... 396/182; 396/241
[58] Field of Search ................................. 396/182, 187, 396/4, 205, 241, 419; 362/11; 315/312–316, 323

[56] References Cited

U.S. PATENT DOCUMENTS

| | | | |
|---|---|---|---|
| 4,552,443 | 11/1985 | Broida | 396/182 |
| 5,016,037 | 5/1991 | Taniguchi et al. | 396/182 |
| 5,331,361 | 7/1994 | Jones | 396/182 |
| 5,835,794 | 11/1998 | Lo et al. | 396/4 |

*Primary Examiner*—W. B. Perkey
*Attorney, Agent, or Firm*—Kenneth Southall; Troutman Sanders LLP

[57] ABSTRACT

A photographic lighting apparatus for consistent and accurate exposure control of a subject before a camera. The apparatus comprises a plurality of light sources, a power supply; a plurality of switches, and a controller. The switches are connected to the plurality of light sources for selectively providing power from the power supply to the light sources. The controller sequentially operates the switches and has user-programmed operational control for manipulating the light upon the subject to create a desired illuminating effect. This sequencing operation of said controller produces accurate exposure of film within the camera.

12 Claims, 10 Drawing Sheets

PHOTOGRAPHIC LIGHTING APPARATUS FOR CONSISTENT AND ACCURATE EXPOSURE CONTROL

BACKGROUND

This invention relates to lighting and exposure equipment for still photographic processes, and specifically to an apparatus which allows for the precise and consistent sequencing of multiple light sources and photographic filters, and for precise and consistent exposure modification through the electronic modulation of the sequencing.

It is common for photographers who are practiced in the field of product or still photography to utilize multiple light sources and filters in the setup and execution of a complex photographic exposure of an object or scene. For necessity of proper exposure and desired effect, light sources of mixed type, intensity, and duration are employed, simultaneously or sequentially. Such sequences are most commonly executed in a non-automated manner, involving trial-and-error of timing, exposure calculations, light switching, multiple power sourcing, and filter changing.

An additional process involved in these types of exposures is known as 'bracketing', in which the photographer will underexpose and overexpose the photographic scene in multiple attempts to procure a range of selectable results. Bracketing is commonly achieved through the modulation of two factors, either the diameter of the camera aperture, known as the 'f-stop', or the time duration that the film is exposed to the light passing through the aperture, known as the 'shutter speed'. The difficulties in such a bracketing technique are the loss of a consistent depth-of-field, or focus, when the f-stop is modulated, and the loss of a consistent length of exposure when the shutter speed is modulated.

The continuous switching on and off of lamps, the exchanging of filters, and the manual lighting of objects with moveable lamps all require a great deal of coordination and effort. This is an inexact method for the exposure of a subject and does not lend itself to efficient, precise, and repeatable results. Difficulties include non-centralized power sources for all the lights needed for the exposure; the inexact repetition of lighting durations due to the longhand manner of their calculations; separate stands for cameras and camera filters; the inexact placement of filters due to the common hand-held technique; and the inexact repetition of lighting patterns due to hand-held lamps or light wands. Additionally, the current technique of bracketing through the use of f-stop or shutter speed is a potential limitation when both f-stop and shutter speed must be fixed for complex aesthetic results.

An apparatus is needed to provide a programmable controlling device which sequences multiple light sources in an efficient, precise, and repeatable manner.

An apparatus is also needed to provide a centralized power actuator unit which is synchronized with the controlling device, so that multiple and varied light sources may be precisely engaged and disengaged at one point of voltage supply.

An apparatus is also needed to provide close-range light sources of low voltage and intensity, so that the object being photographed may be lighted precisely over an extended period of time during the programmed lighting sequences, without the light sources themselves appearing on the exposure.

An apparatus is also needed to provide mounting mechanisms for the close-range lights, so that the lights may be moved in and out of the photographic scene both during and between the exposure in a precise and repeatable manner.

Additionally, there is a need for an apparatus to incorporate into this sequencing system a precision filter changing device, allowing for a plurality of filters to be individually or collectively engaged at specific moments during the lighting actuation.

Finally, an apparatus is needed to digitally modulate the lighting and filtering sequences of the photographic system, so that the technique of bracketing may be achieved through the discrete modulation of the lighting duration as opposed to the unfavorable alteration of either f-stop or shutter speed—a process which to date has been unachievable in a predictable manner.

SUMMARY OF THE INVENTION

The present invention involves an apparatus and method for a precision lighting and exposure control system.

The apparatus comprises a control panel for previewing, programming, and recalling lighting control sequences in an efficient, precise, and repeatable manner. The apparatus also incorporates a power actuator unit capable of applying and removing power to a variety of light sources, of different operating voltages and electrical interface under direction of the control panel. The apparatus also incorporates a servo-controlled filter changer which is installed in front of the camera lens and which is also under control by the system. The apparatus also incorporates light sources which are used for the close-range lighting of objects. These lights incorporate mounting mechanisms which allow for their precise and repeatable positioning during and between the photographic exposures.

The present invention involves a method in which the photographer, after having chosen the lights to be used in an exposure, programs the lights to be actuated at precise moments and for exact durations during the sequence of an exposure through the use of the control panel. The sequence may be previewed, tested, and modified until the desired quantity of light, synchronization, and effect is achieved. This sequence may then be executed during the exposure and repeated for following exposures. The lighting sequence may also be condensed or lengthened proportionately in its duration according to pre-programmed f-stop algorithms, so that an exposure may be accurately bracketed without adversely modifying other photographic variables such as depth-of-field or shutter speed.

Incorporated into this method of sequencing and modulation is the use of close-up light lamps, used for the precise enhancement of a photographic object. These lamps are designed so as to absorb incident light, and thus do not appear on the exposure. These lamps are positioned on mounting mechanisms and can be removed and repositioned with accuracy and efficiency so that the lighting and exposure sequence is not altered during its modification or repetition.

These and other objects, features, and advantages of the invention will become more fully apparent from the following detailed description of the preferred embodiment when read in conjunction with the attached drawings.

DETAILED DESCRIPTION

Figure 1:
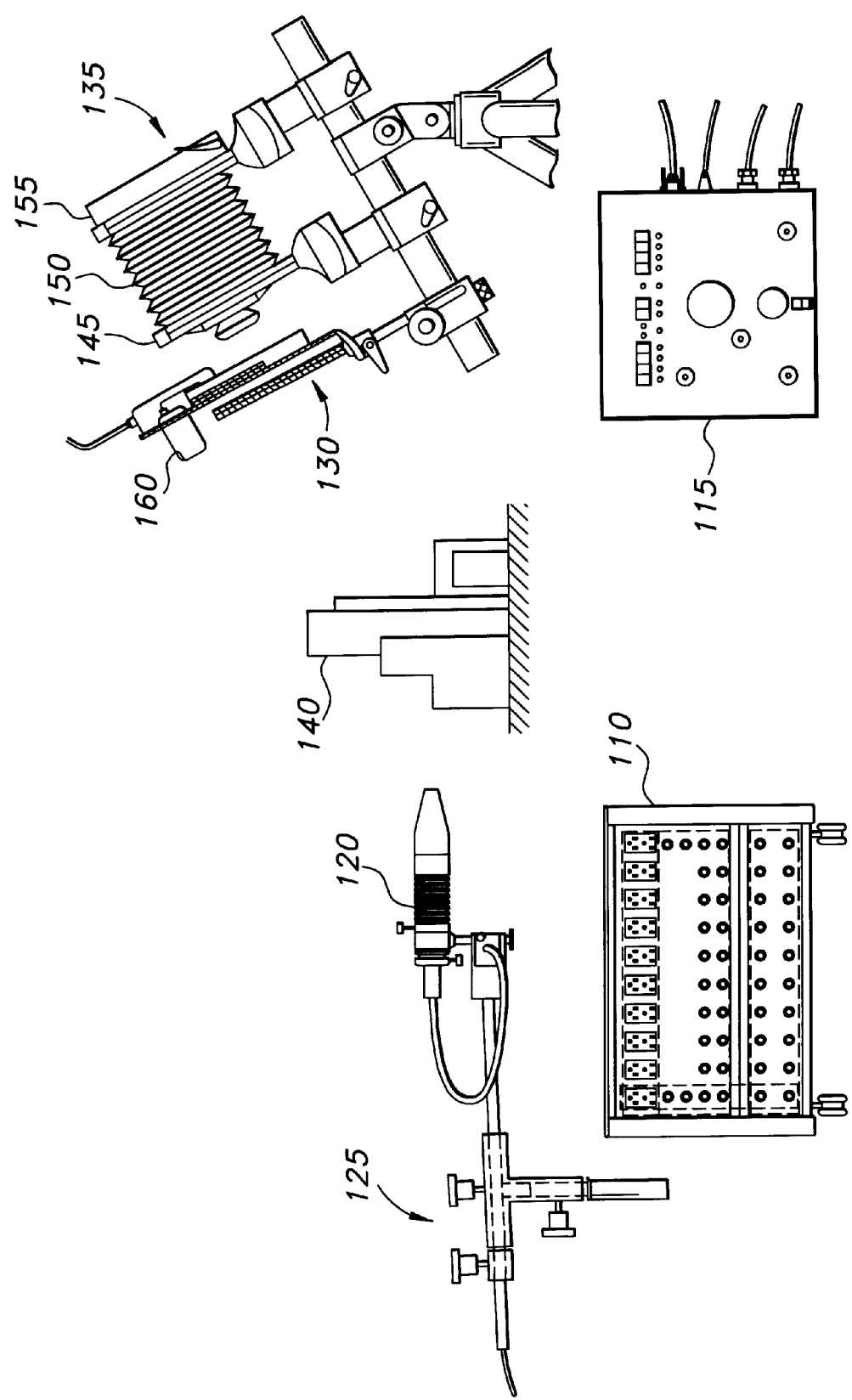
FIG. 1 is an environmental view of the precision photographic lighting and exposure control system of the invention.

Referring now to the figures in which like numbers and letters refer to like elements among the several views, FIG. 1 is an environmental view of the precision photographic lighting and exposure control system of the invention is generally depicted. The preferred embodiment includes a power actuator unit 110, a control panel 115, a repositionable light 120 mounted on a lockable gripping fixture 125, and a filter changer 130 positioned in front a typical 4"×5" camera on a typical photographic stand, generally at 135. The filter changer 130 positions one or more separate photographic filters in front of the camera shutter at specific moments in the programmed lighting sequence. The preferred embodiment uses four filters, #1–#4. Much as the studio lights have been automated to be activated in a precise and repeatable manner in this invention, the function of filter changer 130 is to automate the use of photographic filters in a precise and repeatable manner. The filter changer 130 is mounted exactly as any photographic standard is mounted on a camera stand; it is positioned directly in front of the shutter 145, the bellows 150 and the film plane 155 of a typical 4"×5" professional camera 135. The filter changer 130 has been engineered to introduce zero vibration or movement to the typical camera mount and standards during its use, so that it will not destabilize the camera position in between multiple series of light exposures; may be moved in concert with the adjustments of the bellows camera 135; and may be moved around the studio with the entire camera apparatus. These elements of the exposure control system are located in the appropriate vicinity of a typical photographic subject 140. Cable and wire mechanisms between the components have been eliminated for the sake of clarity.

Figure 2:
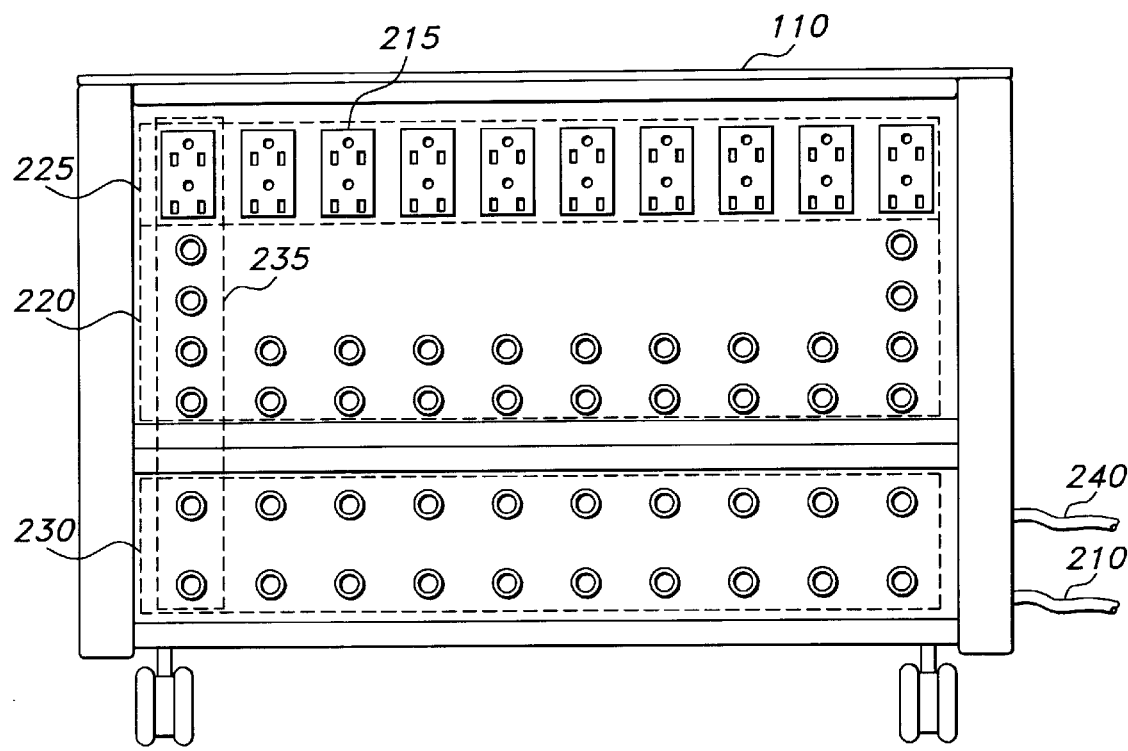
FIG. 2 is a frontal view of the power actuator unit of the invention.

For the purposes of explanation, a typical set-up of the preferred embodiment of the invention will be presented, much as a professional photographer might utilize the apparatus. FIG. 2 is a frontal view of the power actuator unit 110 of the invention. Powered by an AC voltage source from power line 210, the electronics of the unit 110 distributes this power to ten (10) independent channels of sockets 235 arranged horizontally across the front panel of the box (referred to herein as channels #1–#10), for the range of studio lights utilized by the photographer. In professional still photography, studio lights are typically used in one of three formats: strobe lights, or high voltage bursts of light used for the ambient lighting of an exposure, that may be plugged into the power actuator unit 110 at 220; continuous lights, used to light key locations of a subject, that may be plugged into the power actuator unit 110 at 215; and low-voltage, or close-range lighting fixtures, which may be plugged into the power actuator unit 110 at 230. Cable 240 provides low voltage DC power from the power actuator unit 110 to the control panel 115 and control signals from the control panel 115 to the power actuator unit 110.

The primary function of the power actuator unit 110 is to provide electrical stimulus to the particular lighting device connected at the particular channel 235 at the appropriate moment in a programmed lighting sequence for a desired duration. Interface cable 240 provides control signals from the control panel 115 to the power actuator unit 110. The power actuator unit 110 also provides the power to the rest of the components of the apparatus of the invention.

Figure 3:
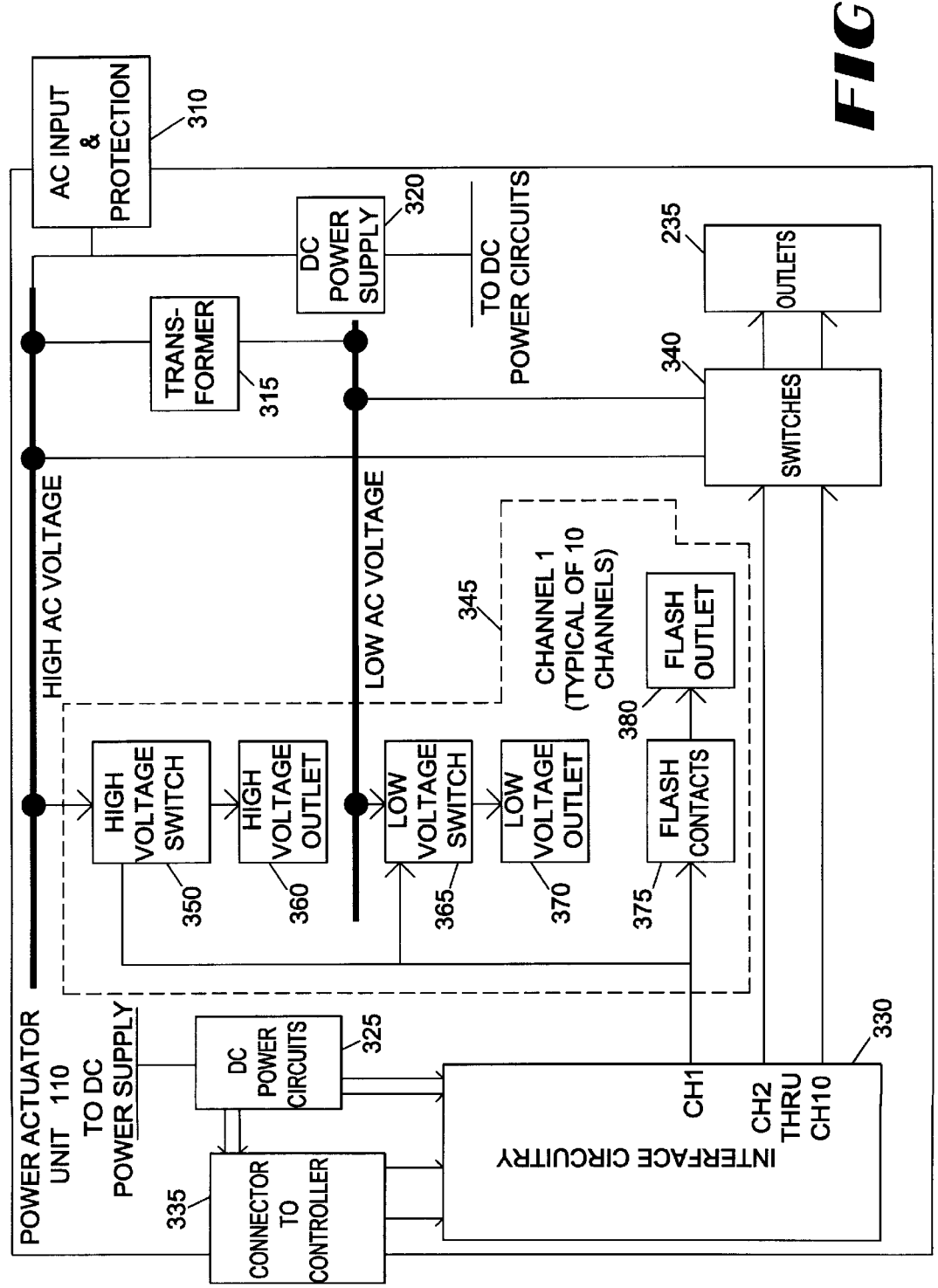
FIG. 3 is a schematic diagram of the electrical components of the power actuator unit of the invention.

FIG. 3 is a schematic diagram of the electrical components of the power actuator unit 110 of the invention. An external AC power source is attached to the power actuator unit 110 at the AC input connector 310 where transient protection is applied. Transformer 315 converts the AC voltage from 110 or 220 volts alternating current to 15.6v alternating current. DC power supply 320 converts the AC voltage from 110v alternating current to +5v direct current to ground, +15v direct current to ground and −15v direct current to ground. DC power supply 320 provides the operating power through the DC power circuits 325 directly to the local interface circuitry 330 and to the control panel 115 via the connector-to-controller panel 335. The interface circuitry 330 receives control signals for each individual channel from the control panel 115 via the connector-to-controller 335 in order to toggle switches 340. Switches 340 control the outlet channels 235.

Channel 1 is typical of all 10 channels and is shown as typical switch 345. A typical switch 34 is comprised of the following components: high voltage switch 350 driven by control signal from the interface circuitry 330 directed to the particular high voltage outlet 360; low voltage switch 365 driven by the control signal from the interface circuitry 330 directed to the particular low voltage outlet 370; and flash contacts 375 driven by the properly conditioned stimulus from the interface circuitry 330 directed to the particular flash outlet 380.

Once the desired studio lights have been plugged into the power actuator unit 110, the photographer may move to the control panel 115, the second major component of the apparatus of the invention, to begin programming the sequence of lighting and filtering for the impending exposure process. The control panel 115 has two major functions, first to receive inputs from the operator that result in the desired sequence of logical events, and second, to provide activating outputs to the power actuator unit 110 and filter changer 130 in accordance with the programmed sequence.

Figure 4:
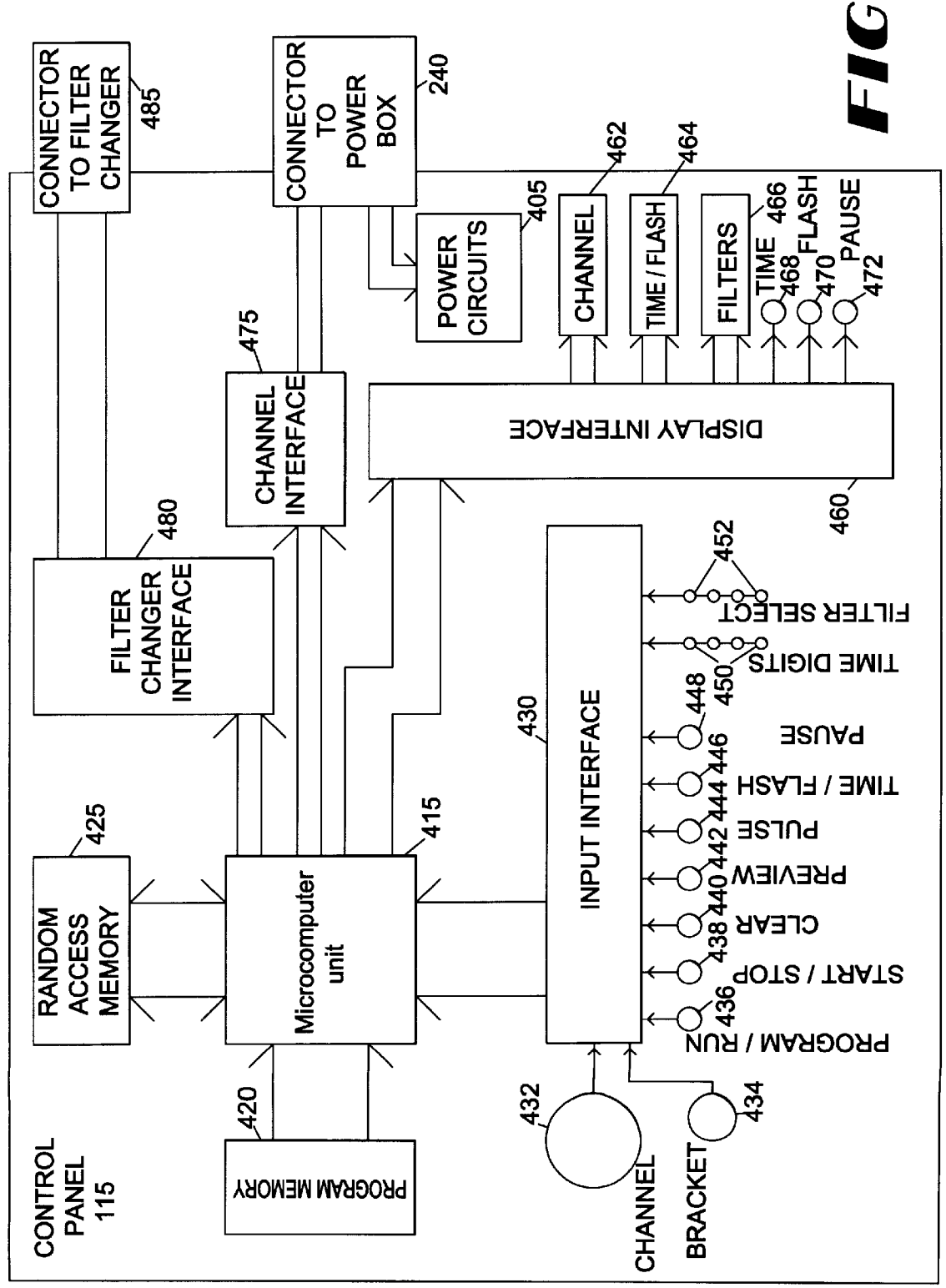
FIG. 4 is a schematic diagram of the electronic components of the control panel of the invention.

The control panel 115 is best explained by referencing FIG. 4. FIG. 4 is a schematic diagram of the control panel 115. After all the system connections have been made and the power actuator unit 110 is powered on, 5v and 15v are conducted from the power actuator unit 110 to control panel 115 through cable 240 to the power circuits 405 and from there distributed throughout the control panel 115 as well as to the filter changer connector 410. In the preferred embodiment, the entire control unit is based on a microprocessor unit 415, a Motorola 68332 processor. Many different microprocessors, embedded computers or controllers could be used to achieve the features of the control unit. In addition, one skilled in the art of electronics will realize that a microprocessor could be replaced with a number of timers, switches, relays and other discrete components to achieve the sequencing function of this controller.

Microprocessor unit 415 receives its programming information from program memory 420. In addition, microprocessor unit 415 has random access memory 425 for storage of sequencing information. Microprocessor unit 415 is also in communication with user interface 430. User interface 430 has a number of input devices attached thereto to facilitate receiving input information from the user. Channel selector 432 sends a channel select signal to input interface 430. Bracket select knob 434 sends a bracketing signal to input interface 430. Program run switch 436, start/stop switch 438, clear switch 440, preview switch 442, pulse switch 444, time/flash switch 446, and pause switch 448 are all in communication with input interface 430. Also, time digits buttons 450 and filter select buttons 452 are connected to input interface 430. Microprocessor unit 415 also is in communication with display interface 460. Display interface 460 is connected to three digital indicators: channel indicator 462; time/flash indicator 464; and filter indicator 466. Also display interface 460 is connected to three light indicators: time indicator 468, flash indicator 470 and pause indicator 472.

Microprocessor unit 415 is in communication as well with channel interface 475, channel interface 475 then goes to connector cable 240. In addition, microprocessor unit 415 is in communication with filter changer interface 480 which is connected to the filter changer cable 485.

On power-up the microprocessor unit 415 goes through a routine start-up sequence. After finishing the start-up sequence, this microprocessor unit, informed by the program memory 420 and holding information in the random access memory 425, assumes a 'program mode' and begins to monitor all of the inputs to build the program sequence in the random access memory 425.

Figure 5:
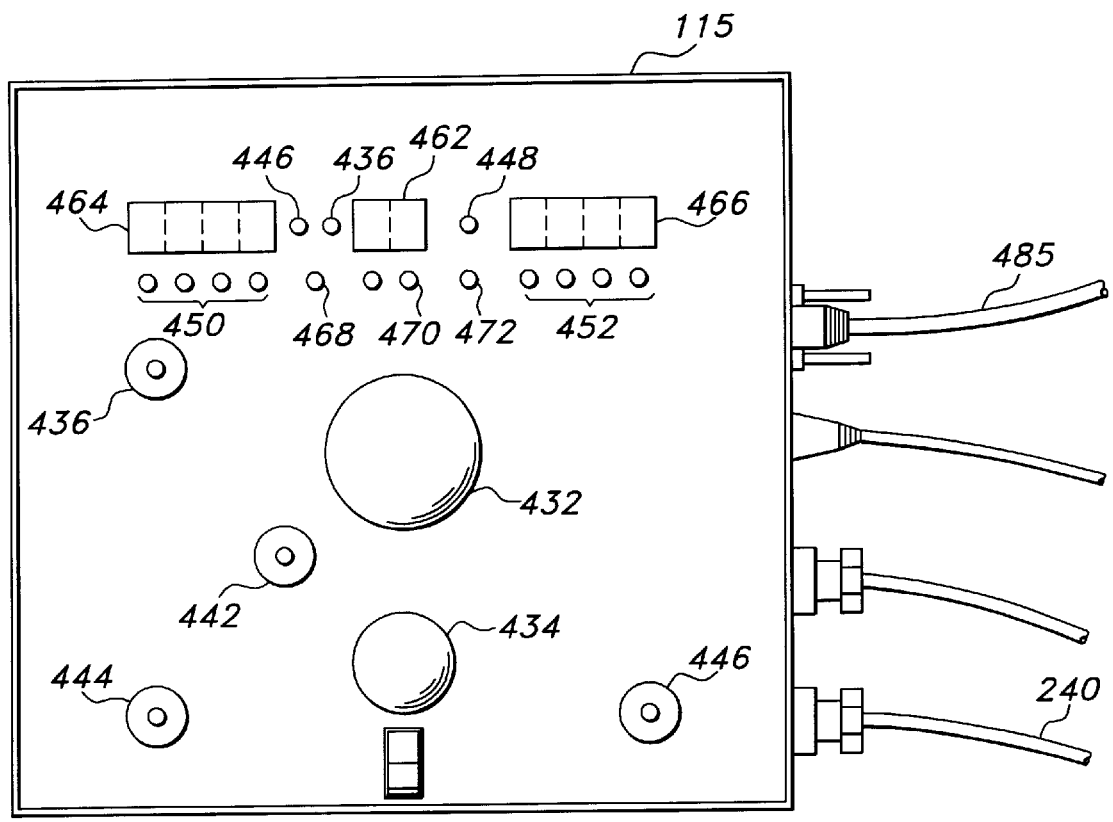
FIG. 5 is a frontal view of the control panel of the invention.

FIG. 5 is a frontal view of the control panel of the invention. A description of the operation of the unit follows with reference to FIG. 5. At this point, the photographer is ready to program the sequence of studio lights for specified durations of time, which will then be executed by the apparatus of the invention in a precise and repeatable manner. These sequencing commands will be stored within the control panel 115. A programming example will be used to highlight features of this preferred embodiment. In this example, the photographer would like to utilize one strobe, or high-voltage lamp, which has been plugged into channel #1 to provide overall ambiance to the exposure scene. In addition, the photographer would like to utilize a continuous, or 'key' lamp, at 110v and a low voltage or 'highlight' lamp, at 15v. These two lamps have been plugged into channels #2 and #3, respectively.

The following process would then be followed. Program/Run switch 436 is placed in the program position. The channel control knob 432 may be dialed to display "1" at channel display 462. The photographer would then indicate that the type of lamp is a strobe lamp by depressing the time/flash button 446 so that the lamp at 470 indicates 'flash' by turning on. Next, the photographer selects the number of times that the strobe lamp will be fired, in the format of ###.# or hundreds of times, tens of times, times, and recycle time (or the amount of time that the strobe-firing charger will recharge between firings), respectively. The time digits controls 450 are operated in a cyclical digital manner, so that if the user depresses these control buttons 450 repeatedly, the time/flash display 464 will cycle through the digits 1–9 and 0 repeatedly until the desired digit is displayed. For example, if the photographer enters the digits 004.5, this indicates four consecutive firings of the strobe lamp with five seconds of recycle time in between.

Next, the photographer would rotate the channel control knob 432 until the number "2" is indicated at channel display 462. Plugged into channel #2 in this scenario is a continuous studio light, and requires that the time/flash button 446 be depressed to indicate 'time' at lamp 468. A quantity of time may be entered at the time control digits 450, in the format of ###.# seconds, or hundreds of seconds, tens of seconds, seconds, and tenths of seconds, respectively, which is displayed at time/flash display 464. In this example, the photographer enters ten (10) seconds displayed as 010.0.

Next, the photographer would rotate the channel control knob 432 until the number "3" is indicated at channel display 462. Channel #3 being a low voltage studio light in this scenario, would require that the time button 446 be depressed to indicate 'time' at 468. A quantity of time may be entered at the time control buttons 450, in the standard format of ###.# seconds, displayed at time/flash display 464. In this example, the photographer enters forty-two (42) seconds displayed as 042.0.

After the sequence program has been built, the program/run switch 436 will be placed in the 'run' mode. At this point, the control panel 115 monitors the start/stop control 438 and when activation of this control is detected, the control panel 115 executes the full programmed sequence of light activation. Using the example provided in the preceding paragraphs, channel #1 would fire the a strobe studio light four (4) consecutive times with 5 seconds in between each firing, then after which channel #2 would fire a continuous studio light for 10 seconds, then after which channel #3 would fire a low-voltage studio light for 45 seconds. At the end of the sequence the control panel will wait to 'run' again as instructed by activating the start/stop control 438, or return to the 'program' mode as instructed by activating the program/run control 436 for further additions, deletions, or modifications to the lighting sequence.

It should be noted at this point that the sequence exemplified is merely an example; the ten independent channels of power may each be utilized for any of the three types of lamp-activating power, not all of the channels must be used. In the preferred embodiment, the channels are sequential; the control panel will activate channel #1 first, #2 second, and so on until after channel #10 is activated and at which point the lighting sequence is concluded. One skilled in the art will realize that varying the sequence of channel operation could also be programmed into the unit.

A modification which can be made to the lighting sequencing capabilities of the invention is the bracketing function, which is also positioned and performed at the control panel unit. Once a lighting sequence has been programmed, run, and sample exposures or 'Polaroids' created (i.e. using Polariod™ brand instant film), the final emulsions are ready to be exposed. At this point, the photographer may make several bracketed exposures, or intentional under- and over-exposed emulsions. When the control panel is in the 'run' mode by depressing the program/run button 436 and before the start/stop control 438 is activated, the bracketing knob 434 may be rotated to the left for increments of under-exposure and to the right for increments of over-exposure (each increment equaling ⅓ of an f-stop). Thus, the entire lighting sequence may be shortened or lengthened and bracketing achieved by the adjusted of the duration of incident light, rather than through traditional means of duration of allowed light (shutter speed) or amount of light (f-stop modulation). This allows the speed of action and the depth of field in an exposure scene to be preserved.

At the start of each lighting sequence, the bracket control knob 434 is read as variable "br" and time is scaled by a factor whose value is related to the numerical value of the bracket control 434 using the equation:

$$\text{Adjusted Time} = \text{Programmed Time} \times 2^{br3}.$$

Thus a full f-stop higher (+3 one-thirds=$2^1$) would result in a time multiplier of exactly 2. A one-third f-stop lower (−1 one-third=$2^{-\frac{1}{3}}$) would result in a time multiplier of 0.794. The programmed sequence for the particular channel is executed and then the following event is interpreted and subsequently executed.

Two of the remaining input controls of the control panel have immediate results and are not entered into the sequence program: the preview control 442 and the pulse control 444. When the preview control 442 has been selected, the control panel will energize the channel at the power actuator unit that is presently displayed on the channel display 462. During this preview mode, if channel selector 432 is rotated (resulting in a new channel selected and displayed on channel display 462) then that new channel will be similarly energized at the power actuator unit. Thus, all of the ten channels of the power actuator unit (and thus, all of the various lighting devices plugged into each of the channels) may be quickly previewed. The pulse control 444 works exactly like the preview control 442, except that a controlled, momentary pulse is applied to the selected channel instead of continuous power. This pulse control is utilized for those lights which require a momentary pulse of voltage to release a high charge of stored voltage rather than a continuous supply of low voltage.

At a particular event, while depressed, the clear control 440 will clear the channel indicated by the channel display 462 and if applied longer than momentarily, will clear all channels.

A 'pause' may be introduced to the program sequence by the depression of the pause control 448, displayed on pause indicator 472. This pause will be placed at the start of the particular event, requiring manual intervention to continue the sequence.

Figure 6:
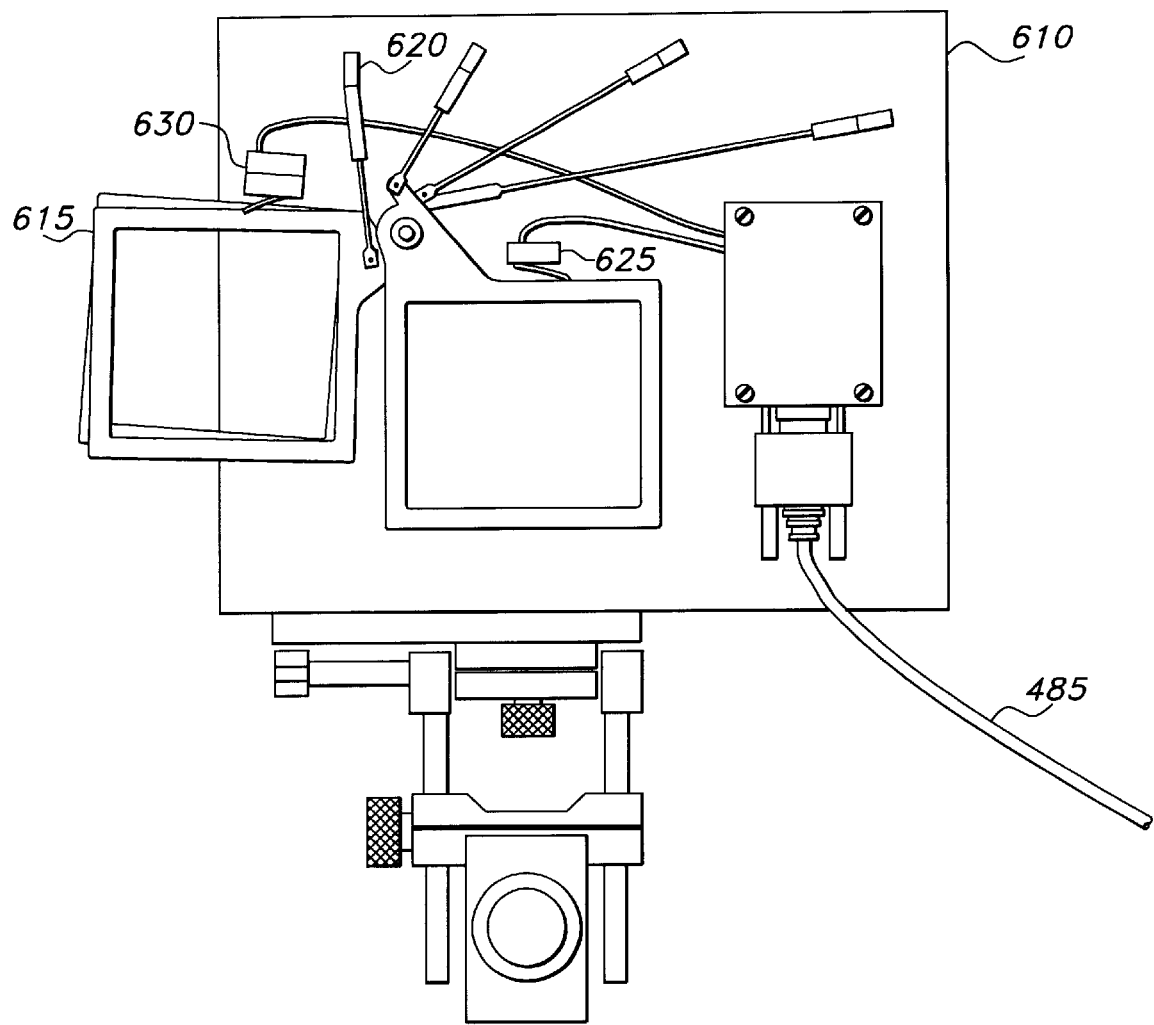
FIG. 6 is a rear view of the filter changer of the invention.

FIG. 6 is a rear view of the filter changer of the invention. The filter changer is seen generally at 610. The filters are mounted in filter frames 615 attached to servo-motor arms 620 activated by rear-mounted precision rotary servo-motors (seen at 160 in FIG. 1). Each filter frame has an associated servo-motor arm 620 and rotary servo-motor 160. Upon a signal from the microprocessor 415 via the filter changer interface 480 and the filter changer cable 485, these servo-motor arms 620 rotate to place the filter frames 615 in front of the camera lens or retract the filter frames 615 away from the camera lens. Position contact switches 625 are utilized to signal to the control panel 115 when a filter changer has been located in position in front of the lens. Retract contact switches 630 are utilized to signal to the control panel 115 when a filter changer has been located away from the lens. Each filter frame 615 has an associated position contact switch 625 and retract contact switch 630. In the preferred embodiment with four filters, there are four filter frames 615, four servo-motor arms 620, four rotary servo-motors 160, four position contact switches 625, and four retract contact switches 630. While the preferred embodiment of the invention uses servo motors and rotatable arms, those skilled in the art will appreciate that other mechanisms can be used to position the filter frames in front of the lens and retract the filter frames from in front of the lens. The mechanisms include, but are not limited to, stepper motors, solenoids, pneumatic and hydraulic actuators, and other electro-mechanical, pneumatic, and hydraulic movement devices.

Referring again to control panel 115 in FIG. 5, when the channel control knob 432 is rotated to the desired power channel 235, indicated at channel display 464, filters #1–#4 may be programmed to swing into position by pressing the filter select 452 which is displayed at filter display 466. The control panel communicates with the filter changer through cable 485. In the above example, if the photographer were to program filter #2 on channel #2, when the said lighting sequence is set to 'run' and activated, filter #2 will be engaged during the two (2) second pause at the beginning of the channel #2 power activation and disengaged during the two (2) second pause before channel #3 power activation begins.

Now that possible features of the invention which may be controlled by the microprocessor 415 have been introduced, a detailed explanation of the run sequence executed by the microprocessor 415 will be given. Starting at B, block 800 sets the current channel to channel number one. Next in block 805, the processor looks to see if an event is defined for this channel. If no event is defined, the channel is incremented. Once the channel is incremented, if this is the last event, the program control proceeds to A 820 where the system is placed back into program mode. If it is not the last event, the control returns to block 805 to see if the event is defined for the next channel. If it is, block 825 updates the display for this event. Program execution continues to block 830 where the microprocessor checks to see if a filter is selected for this particular channel. If it is, in block 835 filters are engaged for this event. If not, in block 840, the microprocessor checks to see whether this is a timed or a flash event. If this is a timed event, the control proceeds to block 845 where instructions are present to execute the timed event. If it a flash event, the control proceeds to block 850 where instructions are in place to execute the flash event.

Figure 8:
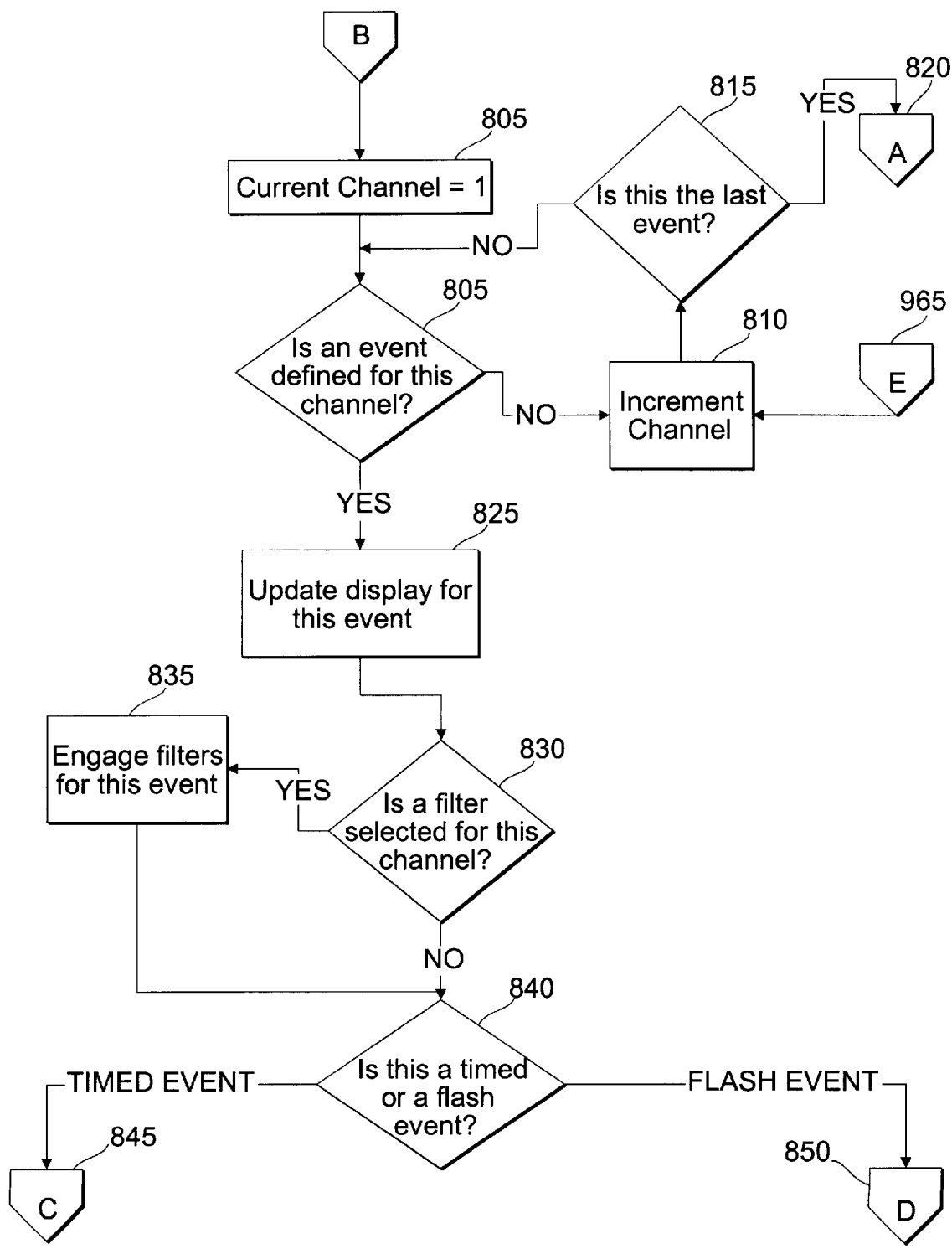
FIG. 8 is a flow chart of the basic run algorithm of the sequencing microprocessor of the invention.
Figure 9:
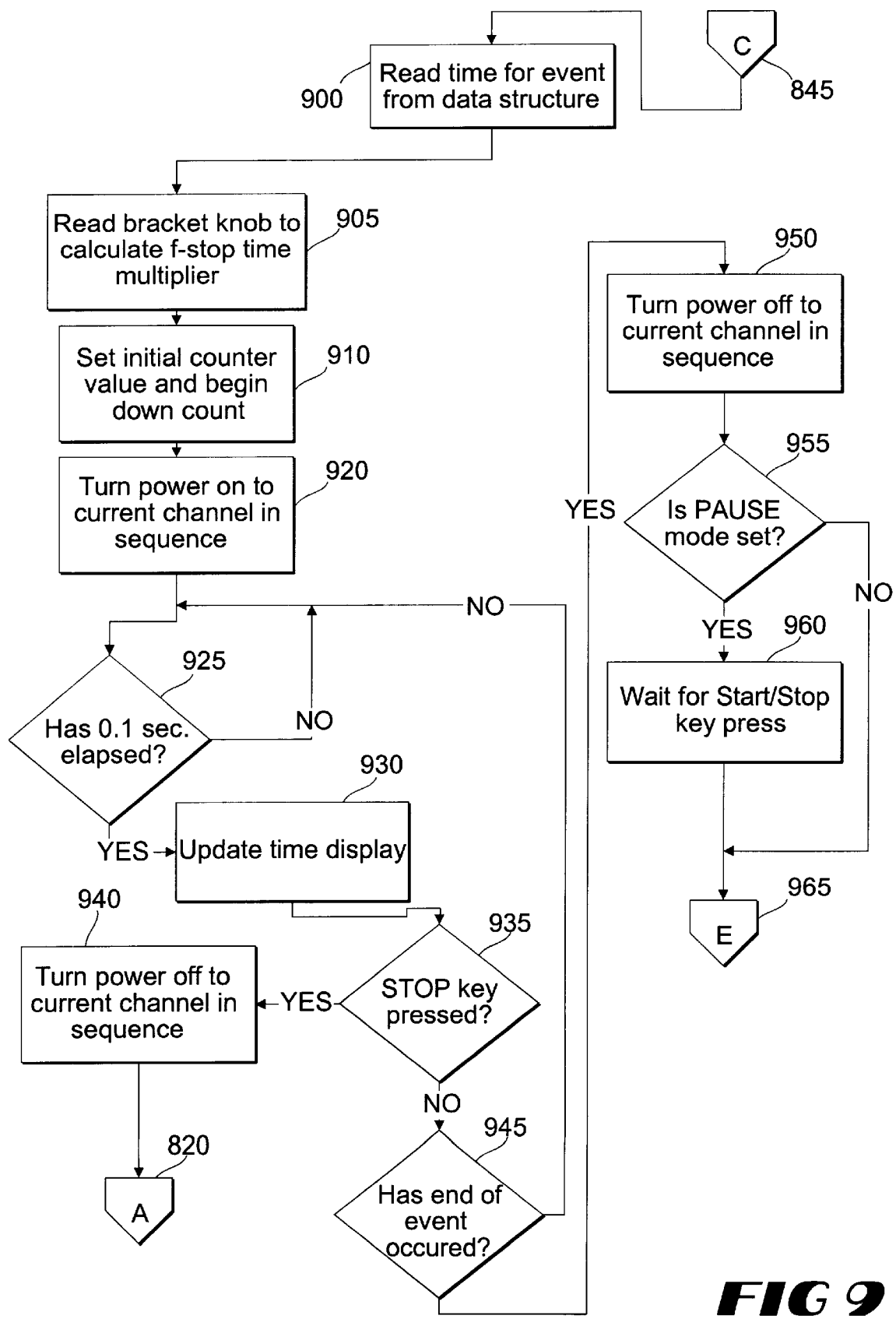
FIG. 9 is a flow chart of the timed event processing algorithm of the sequencing microprocessor of the invention.

FIG. 9 is a flow chart of the timed event processing algorithm of the sequencing microprocessor of this invention. If a timed event needs to be processed, the control continues from block 845 letter C to block 900. In block 900, microprocessor 415 reads from ram the time for the current event. The control proceeds to block 905 where the bracket knob is read to calculate the f-stop time multiplier. Such calculation which is explained in previous paragraphs. In block 910, initial counter value is set and count down begins. In block 920, power is turned on to the currently selected channel in the sequence. Block 925 is a tenth of a second loop. If the tenth of a second has passed, the control proceeds to block 930. If a tenth of a second has not passed, execution stays at block 925. Once a tenth of a second has passed in block 930, the timed display is updated. Once the timed display is updated, the program checks to see whether the stop key is pressed in block 935. If the stop key is pressed in block 935, control proceeds to block 940 where power is turned off to the current channel in the sequence and the microprocessor system is returned to the program mode. If the stop key has not been pressed, block 945 checks to see whether the end of the event has occurred. If it has not occurred, the control returns to block 925. If the end of the event has occurred, in other words the timer has timed down to zero, the control proceeds to block 950 where power is turned off to the current channel in the sequence. Once power is turned off the control proceeds to block 955 where the system checks to see whether the pause mode is set. If the pause mode is set, the system waits for the stop key to be pressed. If not, the system continues to block 965 which is a return from event. Once block 965 return from event is executed, the control proceeds back to FIG. 8 block 810 where the channel is incremented and processing continues.

Figure 10:
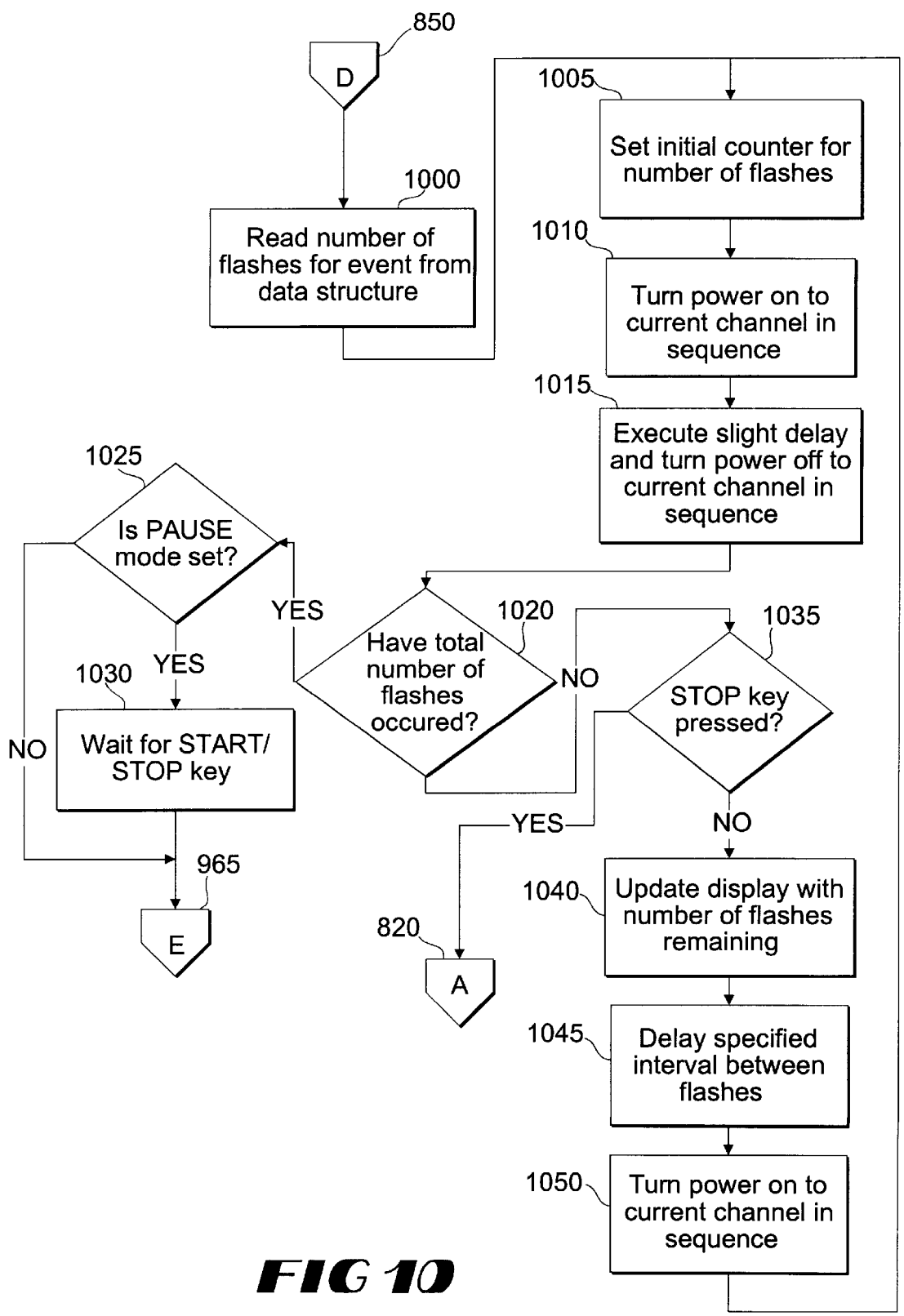
FIG. 10 is a flow chart of the flash event processing algorithm of the sequencing microprocessor of the present invention.

FIG. 10 is a flow chart of the flash event algorithm of the sequencing microprocessor of the present invention. The processing of the flash event begins in block 1000 where the number of flashes for the event is read from the data structure stored in the ram. In block 1005, the counter is set for the initial number of flashes. In block 1010, power is turned on to the current channel selected within the channel sequence. The control continues to block 1015 where after a slight delay power is turned off to the current channel in the sequence. Next in block 1020, the system checks to see whether the total number of flashes have occurred. If the total number of flashes have occurred, the system then checks to see whether the pause mode is set in block 1025. If the pause mode is set in block 1025, the control proceeds to block 1030 where it waits for the start/stop key to be pressed. If pause mode is not set in block in 1025, the system proceeds to block 965, the return from event or the control returns to the sequence shown in FIG. 8 in block 810.

If the total number of flashes have not occurred as checked in block 1020, the control proceeds to block 1035 to see if the stop key has been pressed. If the stop key has been pressed, the control proceeds to block 820 where the system is returned to program mode from run mode. If the stop key has not been pressed, the system goes to block 1040 where the display is updated with the number of flashes remaining. Next in block 1045, the system waits for the specified delayed interval between flashes. Next in block 1050, the power is turned on to the current channel in the sequence and program control returns to block 1000.

Figure 7:
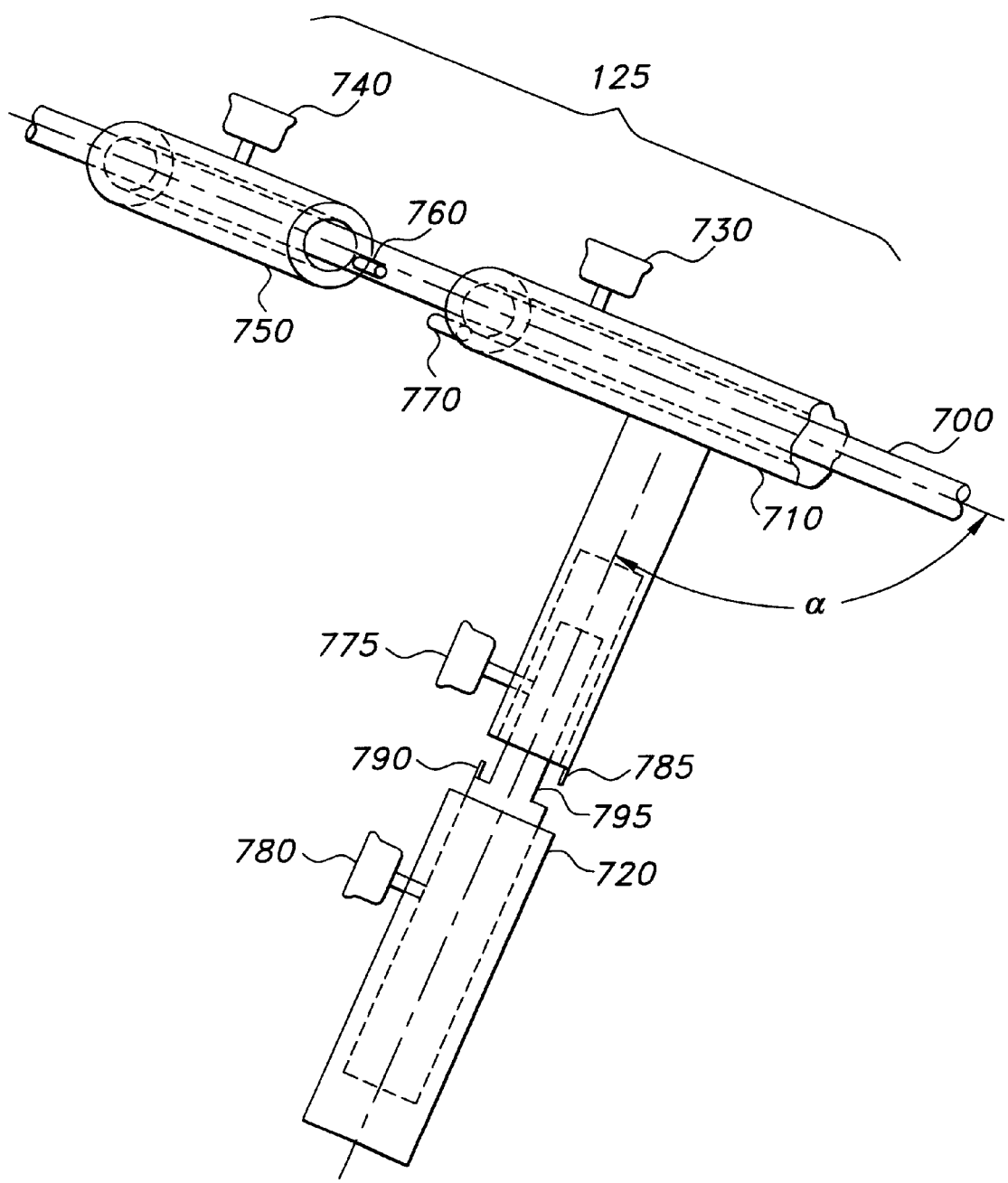
FIG. 7 is an exploded view of the lockable gripping fixture of the invention.

An additional aspect of the present invention is the use of repositionable lights 120. FIG. 7 is an exploded view of the lockable gripping fixture 125 which holds repositional lights 120 of the present invention. In multiple-exposure situations for which this invention is most ideally used, during which sequential channels of differing light sources are activated, these repositionable lights 120 serve the critical function of providing very detailed and close-range light on specific areas of a photographic subject.

The repositionable light's role in the invention are two fold. First, the repositionable light 120 itself serves to provide precision light on a photographic subject at very close range, so that the repositionable light 120 itself will not appear on the exposure. Because the intensity of light is inversely proportional to the square of the distance from the light source to the object being illuminated, a less intense light, and hence a longer time interval to achieve the same relative exposure of the film, is required if the lights are positioned at a greater distance from the subject than if the light is held close to the subject. Thus, a repositionable light 120 that is able to be positioned close to the subject allows for more precise focusing and a shorter period of exposure, thus helping to achieve a primary goal of this invention which is an easier, more efficient, and more precise method of lighting.

The second role of these repositionable lights 120 involves the lockable gripping fixture 125. The lockable gripping fixture allows for easy positioning, removal, and accurate and fast repositioning of the repositionable lights 120. The repositionable light 120 is inserted securely into a typical photographer's accessory stand lamp arm 700. The lamp arm 700 is held within the body 710. The body 710 defines a first axis and a second axis with an angle, alpha, between the two axes. Alpha can be between zero (0) and one hundred and eighty (180) degrees, but in the preferred embodiment is equal to ninety (90) degrees. First axis positioning screw 730 is screwed through body 710 and is used to hold the lamp arm 700 in a fixed position relative to first axis rotation and translation. While the preferred embodiment uses screws to retain the body 710, stand 720, and memory housing 750 positions, it will be appreciated by those skilled in the art that other fastening devices such as spring loaded pins, clamps, etc. may be used. First axis memory screw 740 is screwed through first axis memory housing 750. To set the body position of repositionable light 120, first axis positioning screw 730 and first axis memory screw 740 are loosened allowing for translational and rotational movement of lamp arm 700. When the lamp arm 700 is properly positioned to light a subject 40, first axis positioning screw 730 is screwed down to hold lamp arm 700 in a fixed position. First axis memory housing 750 is translated across lamp arm 700 until first axis memory pin 760 is touching body 710. Next, first axis memory housing 750 is rotated around lamp arm 700 until first axis memory pin 760 abuts the first axis fixed pin 770. First axis memory screw 740 is then tightened against lamp arm 700. Should the lamp arm 700 need to be removed for any reason, e.g. the repositionable light 120 is in the way of a camera shot, first axis positioning screw 730 may be loosened for the removal of lamp arm 700 without losing the first axis positioning information of the lamp arm 700. Lamp arm 700 can be retracted from body 710 with first axis memory housing 750 still fixed to the lamp arm 700. When the lamp arm 700 is replaced in body 710, lamp arm 700 is rotated and translated until first axis memory pin 760 is back in place against the side of first axis fixed pin 770. Thus, the first axis memory pin 760 in combination with the first axis fixed pin 770 assures the photographer that the lamp arm 700 is in its original position from prior to removal.

Similarly for second axis positioning, the lamp arm 700 is held within the body 710. Stand arm 795 runs through body 710 and lamp stand 720. Second axis memory screw 780 is screwed through lamp stand 720 and is used to hold the body 710 in a fixed position relative to second axis rotation and translation. Second axis positioning screw 775 is screwed into body 710. To set the second axis position of repositionable light 120, second axis memory screw 780 is loosened and second axis positioning screw 775 is loosened allowing for translational and rotational movement of body 710. Maintaining the orientation of the body 710, stand arm 795 is rotated and translated so that the pins 790 and 785 are adjacent. Second axis memory screw 780 and second axis positioning screw 775 are tightened to hold the body 710 position. Should the body 710 need to be removed for any reason, e.g. the repositionable light 120 is in the way of a camera shot, second axis positioning screw 775 may be loosened for the removal of body 710 without losing the second axis positioning information of the body 710. When the body 710 is replaced in lamp stand 720, body 710 is rotated and translated until second axis positioning pin 785 is back in place against the side of second axis memory pin 790. Thus, the second axis positioning pin 785 in combination with the second axis memory pin 790 assures the photographer that the lamp arm 700 is in its original position from prior to removal.

Thus, an apparatus and method for precise and repeatable photographic exposure control has been disclosed. The present invention has been described in relation to particular embodiments which are intended in all respects to be illustrative rather than restrictive. Those skilled in the art will understand that the principles of the present invention may be applied to, and embodied in, various combinations of hardware and software with various types of interfaces and technology. Alternative embodiments will become apparent to those skilled in the art to which the present invention pertains without departing from its spirit and scope. Accordingly, the scope of the present invention is described by the appended claims and supported by the foregoing description.

The invention claimed is:

1. A photographic lighting apparatus for consistent and accurate exposure control of a subject before a camera with an open shutter comprising:
   a plurality of light sources for illuminating said subject;
   a power supply;
   a plurality of switches respectively connected to said plurality of light sources for selectively providing power from said power supply to said light sources;
   a controller for operating said switches, said controller having user-programmed operational control for manipulating the light upon said subject to create a desired illuminating effect, whereby the operation of said controller produces the desired exposure of film within said camera as predefined by an operator and may be repeated producing the same illuminating effect.

2. The photographic lighting apparatus of claim 1 further comprising:
   a filter changer, said filter changer comprising
      at least one filter frame movably mounted in front of the lens of said camera;
      at least one filter, said filter placed within said respective filter frame;
      at least one filter actuator for moving said respective filter frame between a first position completely in front of said lens of said camera and a second position completely retracted from in front of said camera, said filter actuator operated by said controller.

3. The photographic lighting apparatus of claim 1 wherein said controller further includes a variable bracketer, said variable bracketer being user-adjustable to uniformly, proportionally vary said user-programmed durational on times of said lights, whereby the exposure of said film may be varied.

4. The photographic lighting apparatus of claim 1 wherein said controller further comprises a microprocessor for sequentially operating said switches.

5. The photographic lighting apparatus of claim 1 wherein said controller further comprises a plurality of discrete electronic devices for operating said switches.

6. The photographic lighting apparatus of claim 2 wherein said controller further comprises a microprocessor for sequentially operating said switches and said filter actuators.

7. The photographic lighting apparatus of claim 2 wherein said controller further comprises a plurality of discrete electronic devices for operating said switches.

8. The photographic lighting apparatus of claim 1 wherein said controller further operates to momentarily turn on at least one of said switches in the operating sequence a user-defined number of cycles before operating the next switch in the sequence.

9. The photographic lighting apparatus of claim 1 wherein one of said light sources is a repositionable light, said repositionable light being removably fixed on a lockable gripping fixture, said lockable gripping fixture comprising a body defining a first bore along a first axis, said body having a proximal end and a distal end, said first bore defining a surface on said proximal end circumscribing said first bore;

a lamp arm having a proximal and distal end rotatably and translationally mounted within said first bore, said repositionable light removably fixed on said distal end of said lamp arm;

a first axis memory housing defining a second bore, said first axis memory housing having a proximal end and a distal end, said proximal end of said lamp arm rotatably and translationally mounted within said second bore such that said distal end of said first axis memory housing is proximate to said proximal end of said body, said second bore defining a surface on said distal end circumscribing said second bore;

a first axis position fastener for adjustably fixing the position of said lamp arm within said first bore;

a first axis memory fastener for adjustably fixing the position of said lamp arm within said second bore;

a first axis fixed pin longitudinally fixed on said surface of said proximal end of said body along said first axis; and a first axis memory pin longitudinally fixed on said surface of said distal end of said first axis memory housing along said first axis whereby said first axis memory fastener and said first axis position fastener may be loosened, said lamp arm positioned in place, said first axis position fastener tightened, said first axis memory housing rotated and translated such that said first axis memory pin abuts said first axis fixed pin, said first axis memory fastener tightened allowing for later removal and reinstallation of said lamp arm from said body through realignment of said pins during reinstallation.

10. A method of providing consistent and accurate exposure control of a subject in front of a camera comprising the steps of:
    placing one or more lights around the subject;
    defining a sequence of operation for said lights;
    programming said sequence of operation into a central controller; and
    executing said sequence of operations from said controller while the shutter on the camera is open such that said central controller operates said lights according to said programmed sequence of operations and said camera captures reflections from the subject onto film within the camera.

11. The method of claim 10 wherein the step of defining a sequence of operation for said lights includes defining duration times and delay times.

12. The method of claim 10 further including
    the step of defining a sequence of operation for one or more filters placed in front of the camera, and
    wherein said programming step further includes the step of programming said filter sequence into said central controller, and further wherein
    said executing sequence further includes the step of replaying said filter sequence to operate said filters.

* * * * *